United States Patent [19]

Pelz

[11] Patent Number: 4,812,190

[45] Date of Patent: Mar. 14, 1989

[54] THERMALLY INSULATING COVERING AND PROCESS FOR PRODUCING

[76] Inventor: Peter Pelz, Dieselweg 10, 8192 Geretsried 2, Fed. Rep. of Germany

[21] Appl. No.: 8,970

[22] Filed: Jan. 30, 1987

[30] Foreign Application Priority Data

Sep. 10, 1986 [DE] Fed. Rep. of Germany ....... 3630852

[51] Int. Cl.$^4$ .......................... B32B 3/22; B32B 3/28; B32B 31/20; F16L 59/04
[52] U.S. Cl. ..................................... 156/221; 156/222; 156/223; 156/224; 156/290; 156/292; 156/300; 156/301; 428/158; 428/161; 428/162; 428/920
[58] Field of Search ............... 156/221, 290, 292, 300, 156/301, 222, 223, 224

[56] References Cited

U.S. PATENT DOCUMENTS

| | | | |
|---|---|---|---|
| 1,999,384 | 4/1935 | Woodall | 156/221 |
| 3,666,604 | 5/1972 | Coffet | 156/221 |
| 3,783,156 | 1/1974 | Kuroda | 156/221 |
| 4,345,958 | 8/1982 | Kuroda | 156/221 |

FOREIGN PATENT DOCUMENTS 2937399 4/1981 Fed. Rep. of Germany .

Primary Examiner—James C. Cannon

[57] ABSTRACT

A thermally insulating covering is provided incorporating a synthetic resin-impregnated carrier mat of fibers and an aluminum foil layer on that entire side of said carrier mat which is to face a heat source. A layer of insulating material is preferably located in predetermined areas between the carrier mat and the aluminum foil. A process for producing such covering is also provided.

10 Claims, 1 Drawing Sheet

THERMALLY INSULATING COVERING AND PROCESS FOR PRODUCING

BACKGROUND OF THE INVENTION

1. Field of the Invention

This invention lies in the field of thermally insulating coverings and processes for producing the same.

2. Prior Art

For protection against radiant heat, use is generally made of mats formed from inorganic fibers, such as, for example, glass, mineral fibers, or fibers of a ceramic nature. As a function of the heat emission magnitude, the thickness of the covering mats is varied, i.e. the greater the insulation requirement, the thicker the mat. This leads to the disadvantages of large insulation space requirements and of thermal instability characteristcs for coverings. These disadvantages are prejudicial and labor-consuming at the time of installation.

BRIEF SUMMARY OF THE INVENTION

More particularly, the present invention is directed to improved thermally insulating coverings comprised of at least one fibrous carrier mat or layer which layer is resin impregnated and has an adjacent layer of aluminum foil bonded thereto.

The present invention is further directed to processes for making such coverings involving compression molding.

The coverings of the present invention provide new and useful thermally insulating coverings which have a high thermal insulating capacity, leading to low space demands and high stability. Thus, the afore indicated prior art problems are overcome.

An object of the present invention is to avoid the above indicated prior art problem and to provide a thermally insulating covering having a high insulating effect adapted for usage in the case of low space availability and of high stability requirements.

By the present invention, this problem is solved and this object is achieved by the provision of a thermally insulating covering incorporating a synthetic resin-impregnated carrier mat comprised of organic fibers which fibers are optionally in combination with inorganic fibers. The carrier mat further incorporates or has a covering least on that side thereof (anticapated) heat source over the entire surface area of such side a layer of aluminum foil. A method for making such covering is further provided.

Other and further aspects, objects, aims, purposes, features, advantages, embodiments, applications, and the like will become apparent to those skilled in the art from the present specification and the appended drawings.

BRIEF DESCRIPTION OF DRAWINGS

Further features and advantages of the invention can be gathered from the attached drawings wherein.

DETAILED DESCRIPTION

Figure 1:
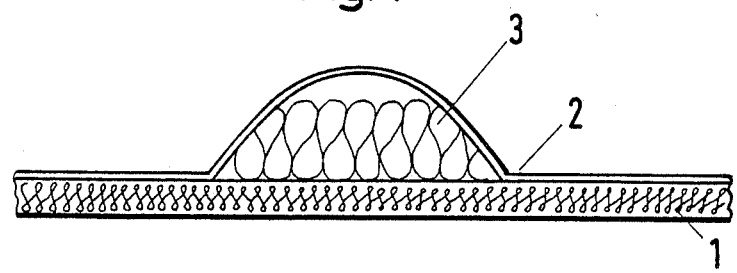
FIG. 1, is a vertical cross-sectional view through a particularly preferred embodiment of the invention.

According to a preferred embodiment of the insulating covering of this invention, a layer of insulating material is located in predetermined regions between the carrier mat and the aluminum foil layer. An insulating material layer can be provided on one or both sides of the aluminum foil in the predetermined regions.

The invention also provides that a further aluminum foil layer is includable in the insulating covering.

According to the invention, the organic fiber comprising the starting carrier mat is selected from the group of fibers consisting of acrylic, polyester, and mixtures thereof.

According to a preferred embodiment of the invention, the carrier mat has incorproated and admixed thereinto, in addition to such organic fibers, from about 10 to 100% by weight (total carrier mat fiber content basis) of glass fibers.

According to the invention, the synthetic resin employed for impregnating a carrier mat is an unsaturated polyester resin, which is preferably applied to the carrier mat at a rate such that the weight ratio of synthetic resin to carrier mat (unimpregnated) is about 1:1.1.

According to a particularly preferred embodiment of the invention, the composition of the layer of insulating material is voluminous basalt or other inorganic insulating wool.

Optionally, the starting aluminum foil layer can be crinkled.

The invention also relates to an improved process for producing a thermally insulating covering structure, in which structure a carrier mat of resin-impregnated fibers is covered on at least one side thereof in predetermined regions with insulating material in a low density layered form, and over such side (including the regions thereof overlaid with such insulating material) is applied a layer of aluminum foil. Such a preliminarily laid-up assembly is then molded under pressure and heat in a compression mold. This mold has depressions formed therein corresponding to such predetermined regions occupied by the insulating material layer(s).

According to a preferred embodiment of the invention, the foregoing process results in a new and useful covering mat product structure of the present invention.

In the inventive process and product, preference is given to the use of a starting carrier mat weighing about 1400 g/m$^2$. The compression or molding pressure employed is preferably about 10$^9$ Pa. The compression or molding temperature is preferably between about 130° and 145° C. The compression or molding time is preferably about 2 minutes.

An insulative covering or structure according to the invention typically is a body which is shaped in accordance with the intended function. It eliminates the aforementioned deficiencies of known thermally insulating coverings. In particularly preferred embodiments, the inventive covering exhibits its improved properties on account of the fact that the heat emission which is to be prevented is not the same at all points from a surface to be covered, so that it is possible to make a covering (for the surface) which is at relatively less stressed points thinner and less firm, so as to be able to obtain fastening points or the like, whereas relatively highly stressed points are more voluminous, i.e. more loose and consequently have a better insulating action. As a whole, the covering is of sparing thickness, so that it can also be used where restricted space conditions prevail, such as for example in machine and apparatus construction. For example, the covering is suitable, for instance, when the heat emission of internal combustion engines has to be restricted by insulation to a limited area, so as to, for example, protect heat-sensitive parts in the immediate vicinity of exhaust pipes.

The coverings of the invention have the following basic structure. The lowermost layer is constituted by a carrier mat compressed of fibers and impregnated with a thermosettable synthetic resin, such as is, for example, known from West German Pat. No. DE-OS 29 37 399. When it is a question of insulating against temperatures of up to about 200° C., at least that side of the carrier mat facing the heat source is covered with a shining white and optionally crinkled aluminum foil. When local shielding up to about 600° C. is to be achieved, a voluminous, loose, inorganic insulating wool layer with a very considerable insulating action is applied to the carrier at the point(s) where the greatest shielding against radiant heat is required. Both layers are then covered with a shining white and optionally crinkled aluminum foil.

The completely assembled starting entity or lay up is placed in a mold in a hydraulic press. The pressing surfaces are designed (shaped) in such a way that at the points where the insulating action must be at a maximum, and where consequently the insulating wool is located, relief depression are formed, so that reduced or no pressure is locally exerted by the mold on the assembly, thereby permitting the insulating wool to retain its desired voluminous, loose character during the molding process.

However, at other points, the covering assembly is compression molded under pressure and heat form a solidified body or laminate. The use of a special adhesive for joining together the individual layers (as in the prior art) is rendered superfluous, because the synthetic resin used for curing the carrier mat fulfills this function. In order to increase the radiant heat shielding capability, when the voluminous insulating layer has an adequate thickness, such layer can be subdivided into two halves or sub-layers by an interposed second aluminum foil layer therebetween.

The depressions in the mold can also be formed correspondingly on both sides, that is, in each of the mold halves, so that insulating layers can be applied to both sides of the carrier, mat, if desired, without being compressed during the molding process.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

As can be gathered from FIG. 1, a thermally insulating covering according to the invention characteristically includes two different layers or areas, a carrier mat 1 and an aluminum foil 2. For insulating effects up to about 200° C., a carrier mat 1 is covered with an aluminum foil 2 on the side facing the heat source. For local shielding up to about 600° C. and even higher, the combination of mat 1 and aluminum foil 2 is locally provided with an interposed additional layer 3 comprised of a voluminous, loose insulating wool 3.

Figure 2:
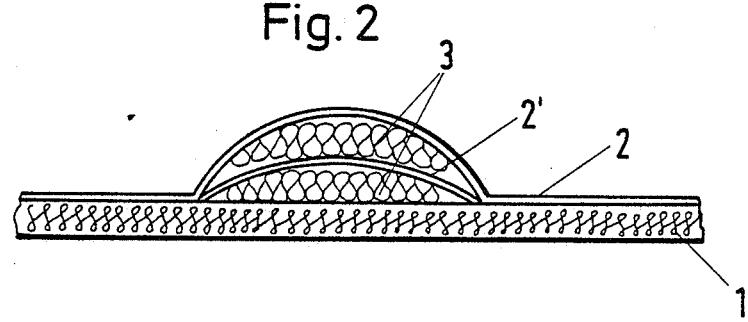
FIG. 2, is a vertical cross-sectional view a second embodiment of the invention.
Figure 3:
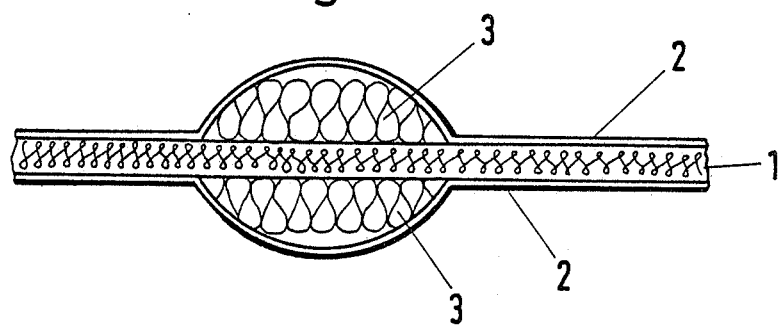
FIG. 3, is a cross-sectional view through a third embodiment of the invention.

If the local shielding must be suitable for still higher temperatures, either one of the respective embodiments of FIGS. 2 or 3 may be used. In the case of the FIG. 2 embodiment, a further aluminum foil layer 2' is provided in the insulating wool layer, the layer 2' in its mid-regions being in transversely (vertically) spaced relationship to each of the respective adjacent layers of mat 1 and foil 2. In the case of the FIG. 3 embodiment, the carrier mat 1 is covered locally on both opposed surfaces thereof with a respective insulating wool layer 3, and then the entire opposed (surfaces) on each side of mat 1 are covered with a respective aluminum foil layer 2.

Synthetic organic fibers, preferably acrylic and/or polyester fibers, are used as the basic material for carrier mat 1 in the production of a thermally insulating covering. As a function of the intensity of the radiant heat against which protection must be provided, quantities of from about 10 to 100 weight percent of glass fibers are admixed therewith in the case particularly of high temperatures. The synthetic resin used for curing and bonding together the individual layers is preferably a thermosettable unsaturated polyester resin preliminarily impregnated into a carrier mat to an extent sufficient to achieve a weight ratio of synthetic resin to carrier mat in range from about 1:1.1.

Then, in predetermined regions, layers of voluminous basalt or other inorganic insulating wool 3 are placed on the synthetic resin-impregnated carrier mat 1. At the corresponding points, the compression molds have depressions. The weight of the carrier mat used is preferably about 1400 g/m$^2$. This entity or assembly is then covered with a thin aluminum foil. The complete entity is placed in the mold assembly which is preferably mounted in a hydraulic press and is molded under pressure and heat action in a generally known manner. The molding pressures are preferably about $10^9$ Pa, and the molding temperatures are preferably about 130° to 145° C. The molding time is preferably about 2 minutes.

If higher local shielding effects are required, either a further aluminum foil layer 2' is placed in the insulating wool layer 3, or the covering of carrier mat 1 formed from insulating wool 3 and aluminum foil 2 is applied to both sides. In the latter case, the depressions in the mold must be formed in both the upper and lower mold parts.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A process for producing a thermally insulating covering comprising the steps of (a) impregnating a carrier mat comprised of fibers with a synthetic resin, (b) covering at least one side of said mat with a layer of insulating mat comprised of an insulating inorganic wool, (c) covering at least one side of said insulating mat with an aluminum foil layer, thereby to provide an assembly and (d) compression molding said assembly under heat and pressure in a mold which has depressions formed therein in regions thereof corresponding to said predetermined localized areas.

2. The process of claim 1 wherein said carrier mat is comprised of fibers selected from the group consisting of acrylic fibers, polyester fibers, and mixtures thereof.

3. The process of claim 2 wherein said carrier mat additionally contains from about 10 to 100% by weight of glass fibers.

4. The process of claim 1 wherein said synthetic resin comprises an unsaturated polyester resin which is used at a rate such that the weight ratio of said synthetic resin to said carrier mat is about 1:1.1.

5. The process of claim 1 wherein said layer of insulating material is comprised of voluminous basalt.

6. The process of claim 1 wherein said aluminum foil layer is crinkled.

7. The process of claim 1 wherein said carrier mat weighs about 1400 g/m$^2$.

8. The process of claim 1 wherein said compression molding is carried out at a pressure of about $10^9$ Pa.

9. The process of claim 1 wherein said compression molding is carried out at a temperture ranging from about 130° to 145° C.

10. The process of claim 1 wherein said compression molding is carried out in a molding time of about 2 minutes.

* * * * *